(12) United States Patent
Yang

(10) Patent No.: US 7,107,974 B2
(45) Date of Patent: Sep. 19, 2006

(54) APPARATUS AND METHOD FOR INCREASING THE RATIO OF AIR TO FUEL OF ENGINE

(76) Inventor: Chin-Yu Yang, No. 92, Mintsu Rd., Mei Nung Chen, Kaohsiung Hsien (TW)

( * ) Notice: Subject to any disclaimer, the term of this patent is extended or adjusted under 35 U.S.C. 154(b) by 0 days.

(21) Appl. No.: 11/058,182

(22) Filed: Feb. 16, 2005

(65) Prior Publication Data

US 2006/0118094 A1   Jun. 8, 2006

(30) Foreign Application Priority Data

Dec. 2, 2004   (TW) ............................. 93137243 A

(51) Int. Cl.
*F02B 33/00* (2006.01)
*F02M 15/00* (2006.01)
*F04B 17/00* (2006.01)
*F04B 35/00* (2006.01)

(52) U.S. Cl. .................. 123/565; 123/559.1; 123/542; 417/362

(58) Field of Classification Search ........ 123/564–565, 123/559.1, 549, 542, 592, 198 E; 417/362
See application file for complete search history.

(56) References Cited

U.S. PATENT DOCUMENTS

| | | | |
|---|---|---|---|
| 1,594,711 A * | 8/1926 | Chapman ................... 48/189.5 |
| 1,909,611 A * | 5/1933 | Charavay ................... 417/362 |
| 2,076,827 A * | 4/1937 | Warren ....................... 181/277 |
| 2,621,849 A * | 12/1952 | Minnis ....................... 417/362 |
| 3,273,788 A * | 9/1966 | Coward, Jr. ................. 417/362 |
| 4,059,082 A * | 11/1977 | McCauley ................... 123/549 |
| 4,537,173 A * | 8/1985 | Norris ........................ 123/592 |
| 4,907,552 A * | 3/1990 | Martin ........................ 123/565 |
| 5,586,540 A * | 12/1996 | Marzec et al. ............ 123/559.1 |
| 6,135,098 A * | 10/2000 | Allen et al. ................. 123/565 |
| 6,295,974 B1 * | 10/2001 | McCants ..................... 123/565 |
| 6,328,024 B1 * | 12/2001 | Kibort ........................ 123/565 |
| 6,769,411 B1 * | 8/2004 | Fabiani ....................... 123/564 |
| 6,817,349 B1 * | 11/2004 | Awasaka et al. ............ 123/564 |
| 6,880,516 B1 * | 4/2005 | Maier et al. ............ 123/198 E |
| 2003/0106319 A1 * | 6/2003 | Kopko ........................ 60/775 |
| 2005/0172587 A1 * | 8/2005 | Moredock et al. ............ 55/396 |

\* cited by examiner

*Primary Examiner*—Thai-Ba Trieu
(74) *Attorney, Agent, or Firm*—Lei C. Lei

(57) ABSTRACT

An apparatus and method for increasing the ratio of air to fuel of engine is disclosed. The method comprises the steps of providing air to fuel injection mechanism by fan; adjusting the speed of fan by the voltage generated by the generator a car so that the corresponding air from the fan is based on the depression of the accelerator of the car; thereby the air to fuel ratio of engine is increased and the engine provides the best efficiency. The device is characterized in that the front side of the housing is a hollow storage cylinder and a passage is provided to the housing, and a fan is mounted at the passage, and the fan is controlled by a controller based on the speed of rotation of the engine and the storage cylinder is mounted with a filter.

1 Claim, 6 Drawing Sheets

APPARATUS AND METHOD FOR INCREASING THE RATIO OF AIR TO FUEL OF ENGINE

BACKGROUND OF THE INVENTION (a) Technical Field of the Invention

The present invention relates to an apparatus and method for increasing the ratio of air to fuel of engine, and in particular, using voltage of a generator to control the air output capacity of an air stream accelerator so as to provide the required air capacity for fuel at an appropriate time and amount so that the air to fuel ratio is increased.

(b) Description of the Prior Art

Air to fuel A/F ratio is a ratio of the required air to fuel in the course of engine combustion. In theory, for a complete combustion the air to fuel ratio is 15.1:1. In conventional fuel injection engine, as shown in FIG. 1, the air and fuel supply system includes a fuel ejection mechanism 2 at the front of the cylinder 1, and a connection tube 3 is connected to air filter 4. As shown in FIG. 2, when the amount of fuel is large, the air inlet valve will open wider so as to absorb more air to mix with fuel. The mixed air and fuel is ignited within the cylinder, generating power to the engine. The air inlet sensor 31 detects the amount of inlet air and the detected data is reflected at the fuel injection control system to eject corresponding amount of fuel so as to obtain the best air-fuel ratio to allow the engine to provide best efficiency. However, when the vehicle is at a higher region, due to the insufficient air via the inlet valve the air to fuel ratio will reduce. Thus, in complete combustion will occur within the cylinder and the power of the engine is reduced. In order to solve the above drawback, turbo changer is employed but the exhaust gas used for turbo charger has little oxygen, and therefore the air to fuel ratio is maintained at 9:1. Otherwise the cylinder of the engine cannot withstand the explosion force. In view of the above it is an object of the present invention to provide an apparatus and method for increasing the ratio of air to fuel of engine which overcomes the above drawback and to improve the power of the engine.

SUMMARY OF THE INVENTION

The primary purpose of the present invention is to Accordingly, it is an object of the present invention to provide a method of increasing air to fuel ratio of an engine comprising the steps of providing air to fuel injection mechanism by fan; adjusting the speed of fan by the voltage generated by the generator a car so that the corresponding air from the fan is based on the depression of the accelerator of the car; thereby the air to fuel ratio of engine is increased and the engine provides the best efficiency.

Yet another object of the present invention is to provide a device for increasing the air to fuel ratio of an engine, having a housing and an air stream accelerator, characterized in that the front side of the housing is a hollow storage cylinder and a passage is provided to the housing, and a fan is mounted at the passage, and the fan is controlled by a controller based on the speed of rotation of the engine and the storage cylinder is mounted with a filter.

Still a further object of the present invention is to provide an apparatus and for increasing the ratio of air to fuel of engine, wherein the number of fan of the accelerator is either one or more than one based on the size of the cylinder.

Still yet another object of the present invention is to provide an apparatus and for increasing the ratio of air to fuel of engine, wherein the air stream accelerator is a fan with a housing and air filtering device used in the car is used for air filtering.

Other objects, and advantages of the present invention can be more fully understood by reading the following detailed description of the preferred embodiment, with reference to the accompanying drawings.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
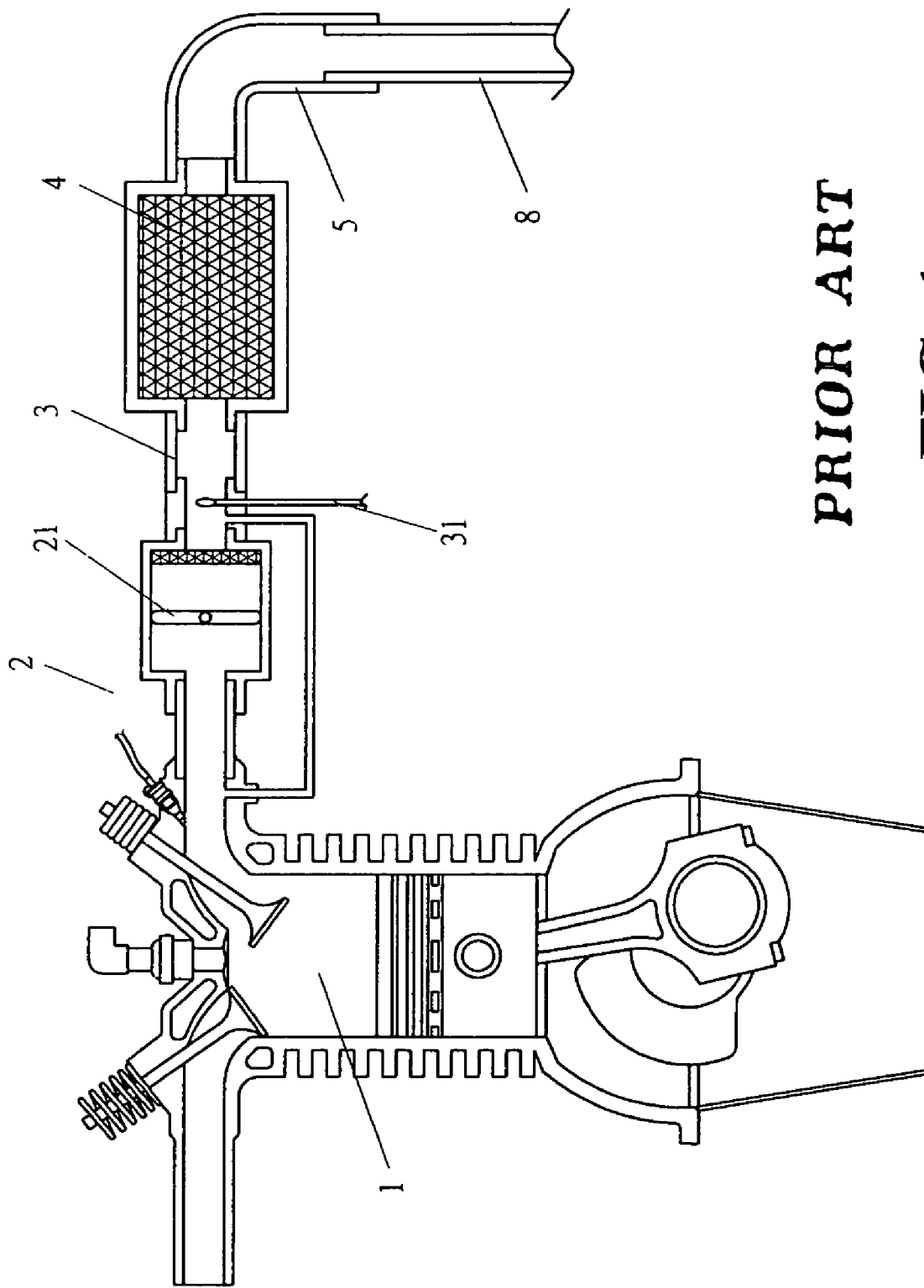
FIG. 1 is a perspective view of a conventional air inlet system of an engine.
Figure 2:
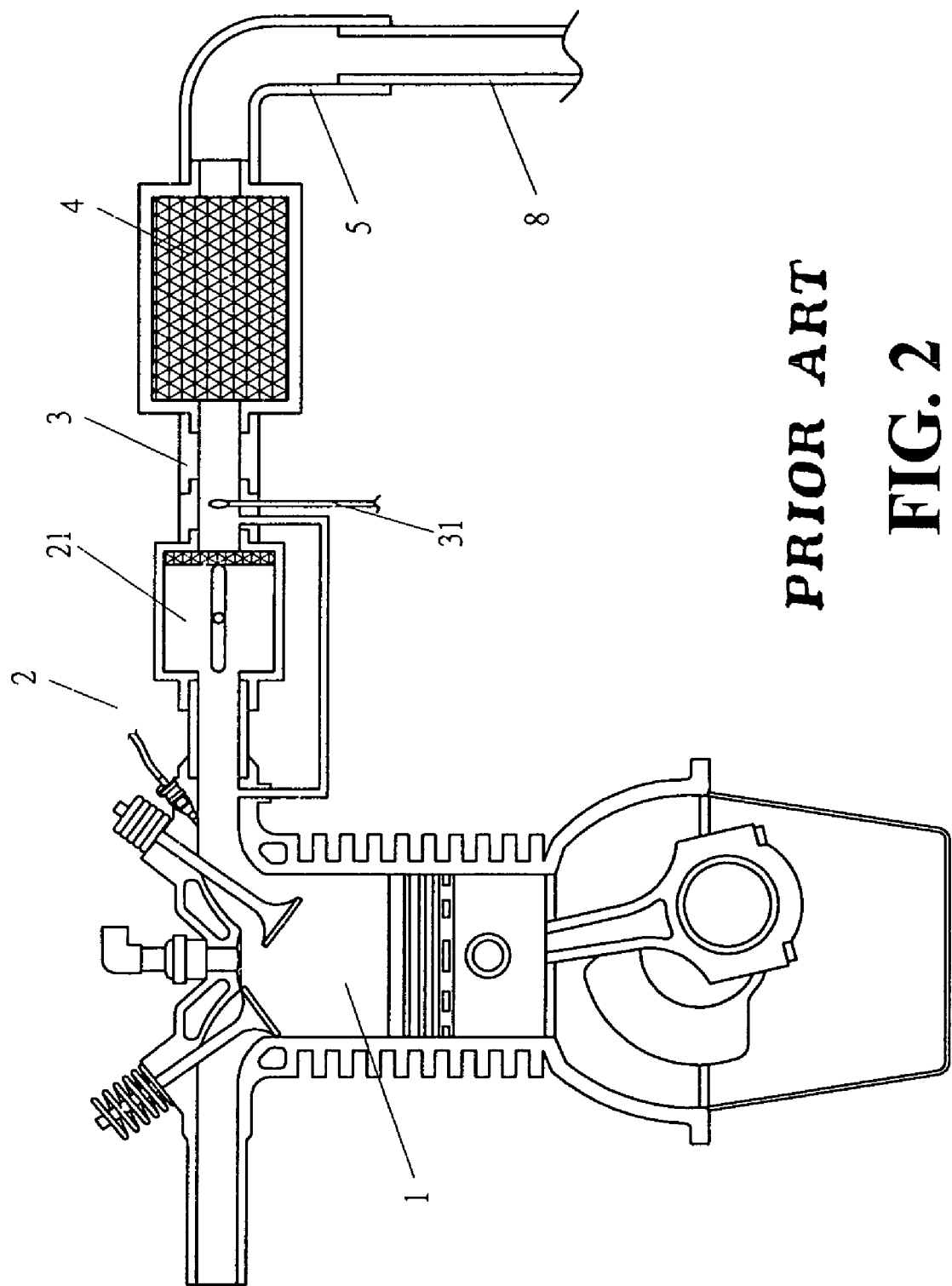
FIG. 2 is a schematic view showing the action of the air inlet system of a conventional engine.
Figure 3:
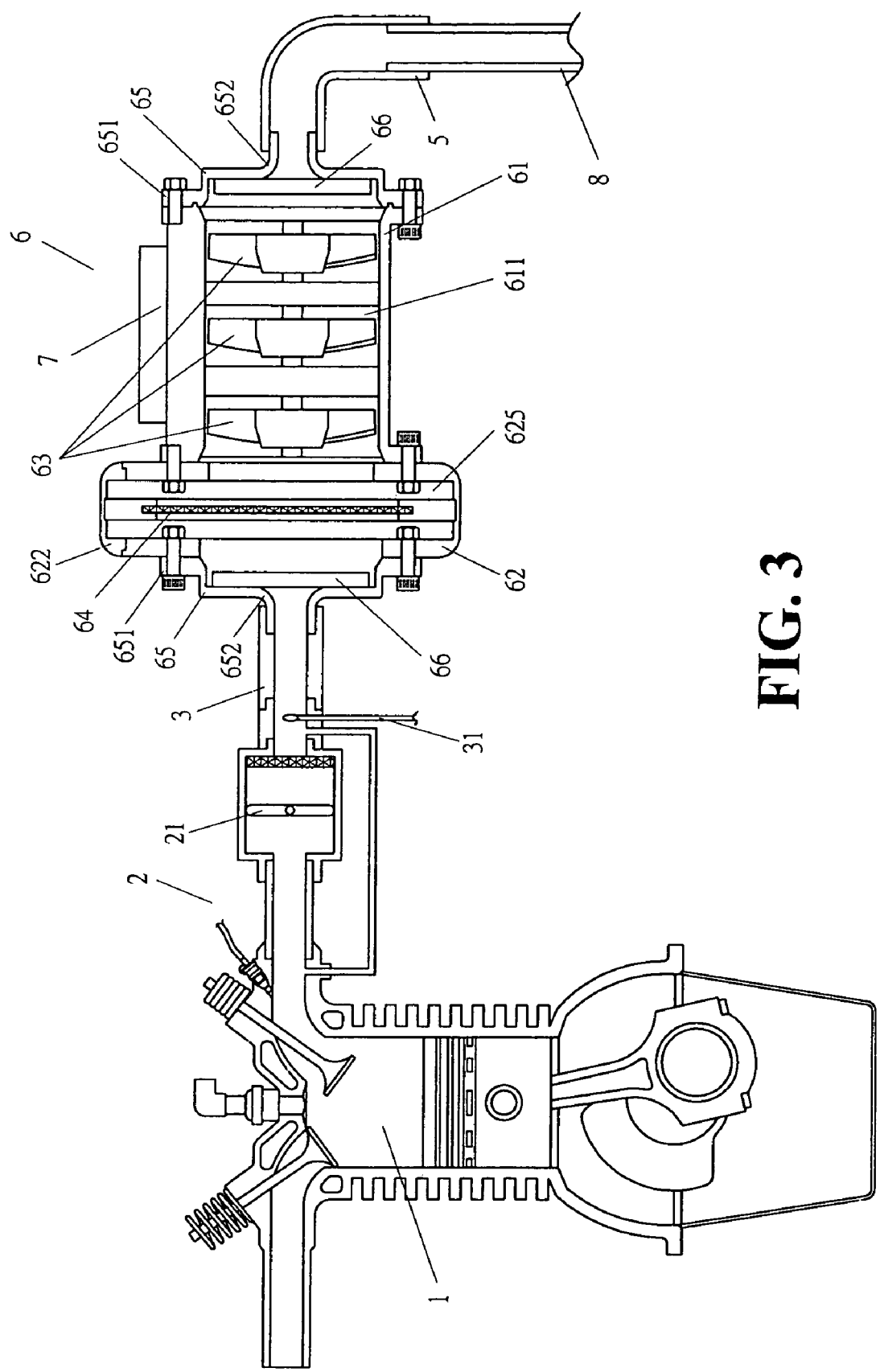
FIG. 3 is a schematic view showing the air inlet of the engine of the present invention.

Referring to FIG 3, there is shown an apparatus for increasing the air fuel ratio of the engine, wherein the front section of the fuel injection mechanism 2 is connected to an air stream accelerator 6. The air stream accelerator 6 includes a housing 61, an air-storage cylinder 62, a plurality of fans 63, and a filter 64, wherein the housing 61 is provided with a controller 7, and the front end of the housing 61 is provided with a connection tube 3 joining to the end portion of the fuel injection mechanism 2 and the other end is connected to the air suction tube 8. The filter 64 can be unloaded and the number of fans varies according to the capacity of the cylinder. The rotation of the fan 63 is controlled by the controller 7.

Figure 4:
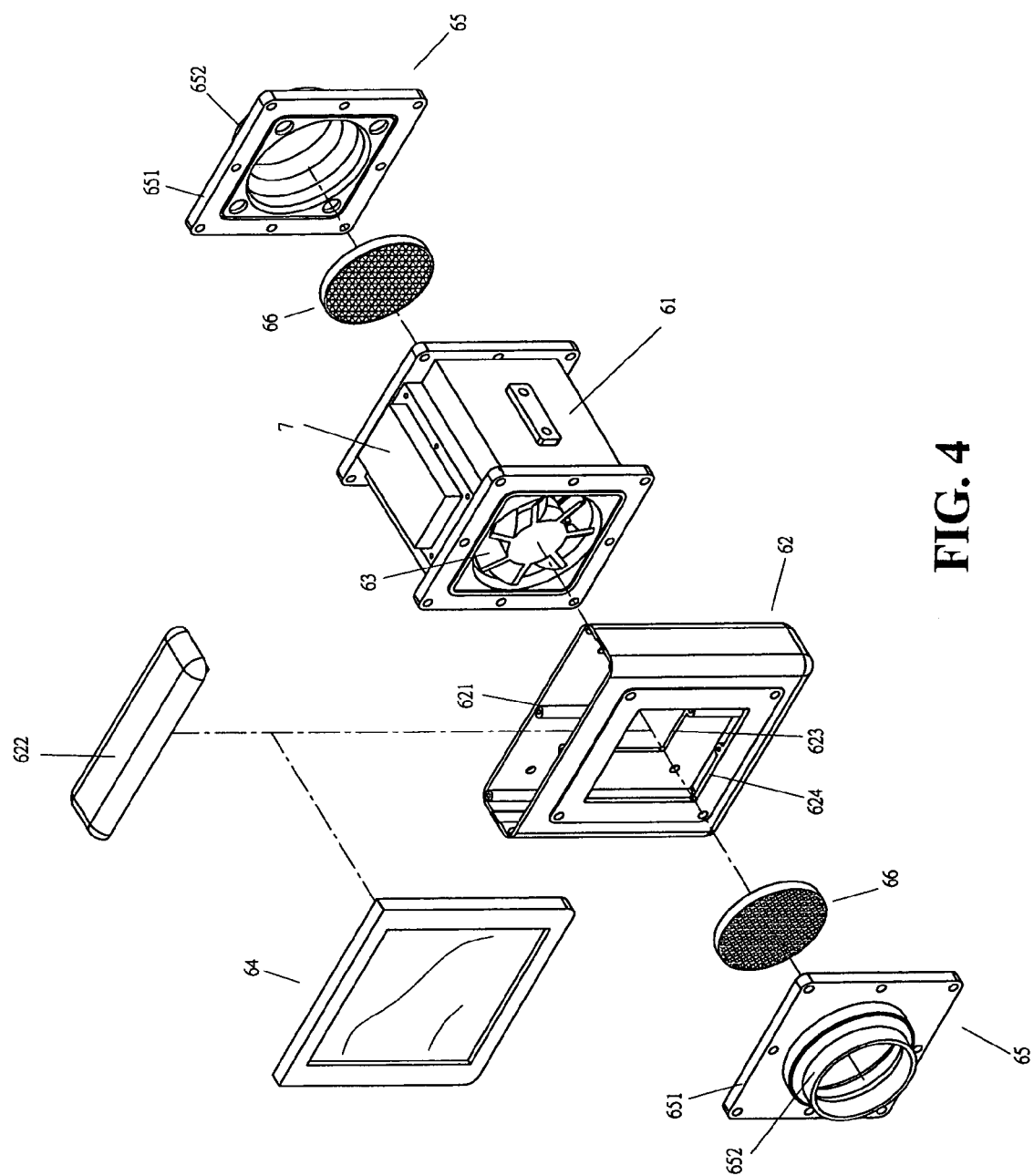
FIG. 4 is an air stream accelerator as shown in FIG. 3 of the present invention.

As shown in FIG 3, the front side of the fuel injection mechanism 2 is provided with an air storage cylinder 62, and as shown in FIG 4, a connection seat 65 is provided between the rear end of the housing 61 and the external end of the air-storage cylinder 62. The two ends of the housing 61 have an open hollow cylinder body, and the passage 611 of the cylinder body is provided with three fans 63, the number of which is depending on the capacity of the cylinder. The air-storage cylinder 62 is hollow which can engage with filter 64 and a cover plate 622 covers the opening 621 at the top portion of the cylinder body so that the filter 64 can be withdrawn for cleaning or substitution. The hole 623 at the rear side is connected to the end opening of the housing 61, and the hole 624 at the front size is connected to the connection seat 65 and each of the two connection seats 65 has a base plate 651 provided with a hollow connector 652 at the center in which is fitted a net hole plate 66. In design, the net hole 661 on the net hole plate 66 allows the pressure of the absorbed air to be increased to avoid foreign objects from entering. The controller 7 is provided at the top section of the housing 61 and the rear side of the housing 61 connected to the air inlet tube 8 to be connected by the air inlet tube 5 to the car.

Figure 5:
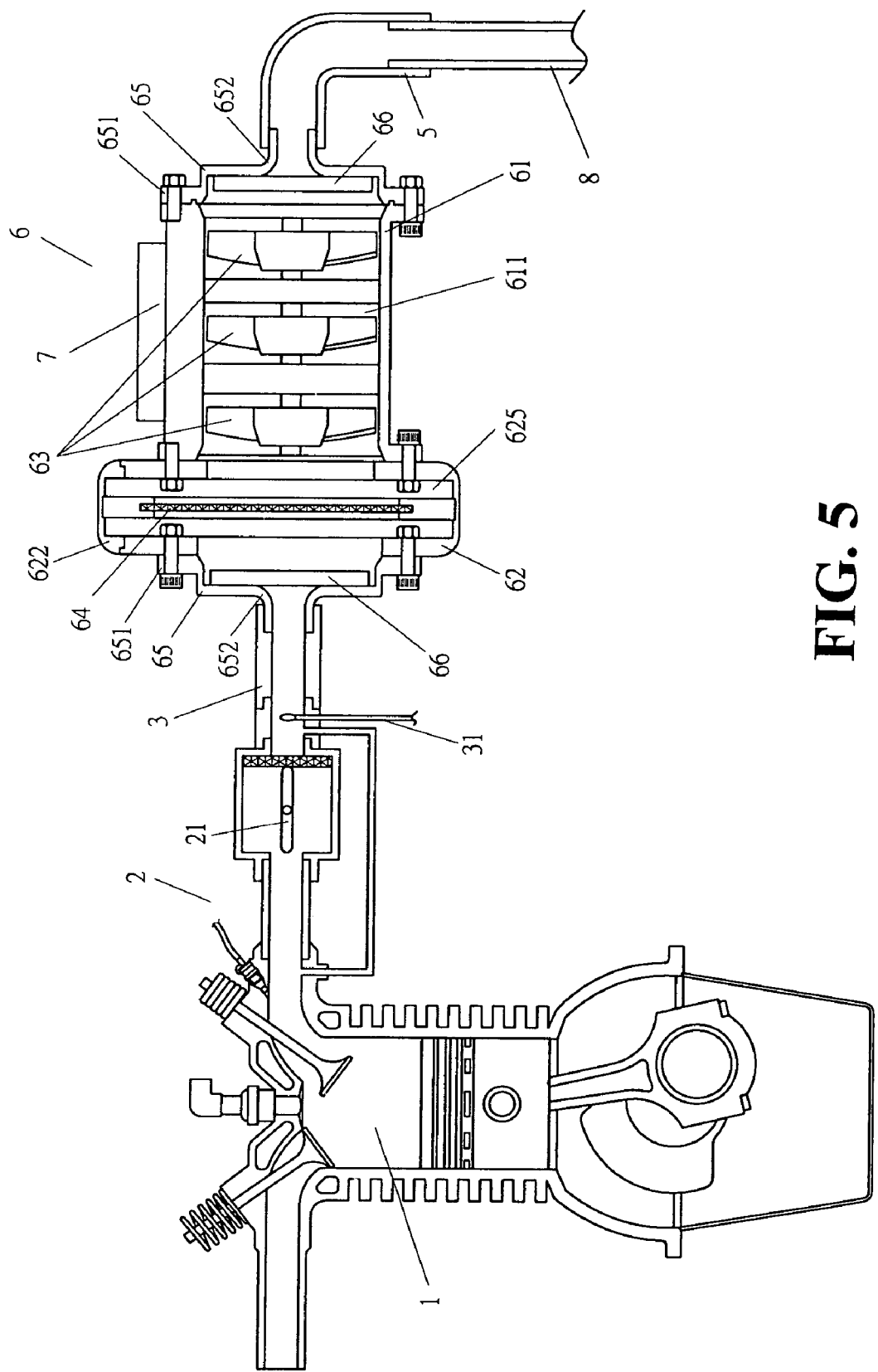
FIG. 5 is a schematic view showing the action of the air inlet system of the present invention.

As shown in FIG. 3, in application, within the 20 second of engine in operation, the engine provides power without exhausting power from the battery. The air inlet valve 21 of the fuel injection engine 2 is close. The engine is idle and the generator only provides low speed operation, and the voltage of the generator controls the fan 6 to rotate at low speed and the pressure of wind by the fan is low which cannot enter the air inlet valve 21. The air from the fan 63 is stored at the air storage cylinder 62 and is sealed in the air storage chamber 625. As shown in FIG. 5, when the accelerator pedal is depressed, the size of the air inlet 21 is depending on the extent of the depressed pedal and when air inlet 21 is opened, the air in the air storage chamber 625 enters the cylinder via the air inlet valve 21, and the rotation of engine is increased and the voltage is also goes higher. The controller 7 increases the rotation of the fan 63 and when the fan is at the highest rotation, air enters the suction tube 8 to the valve 21 together with the fuel. Due to the fact that the air is cold, it contains higher oxygen, and after filtering by the filter 64, it mixes with fuel and compressed within the cylinder. Thus, a higher power is generated when the fuel is ignited. Due to the fact that the fuel vapor of the air to fuel is higher, complete combustion is obtained and carbon residue will not be accumulated at the cylinder, and therefore the fuel vapor is completely burnt and effective power is generated.

The rotation of fan 63 is controlled by the voltage of the generator and the fan provides air at an appropriate timing based on the amount of depression on the accelerator. Thus, the timing to provide air and fuel is the same, there is no lagging in acceleration and the gear shifting is smooth.

When the car is driven on a highland, the oxygen content in the air is low and voltage of the generator increases as the engine revolution increases, the controller 7 controls the air supply by the fan 63 so that the engine of the car generates power. In other words, the car is provided with sufficient power.

Figure 6:
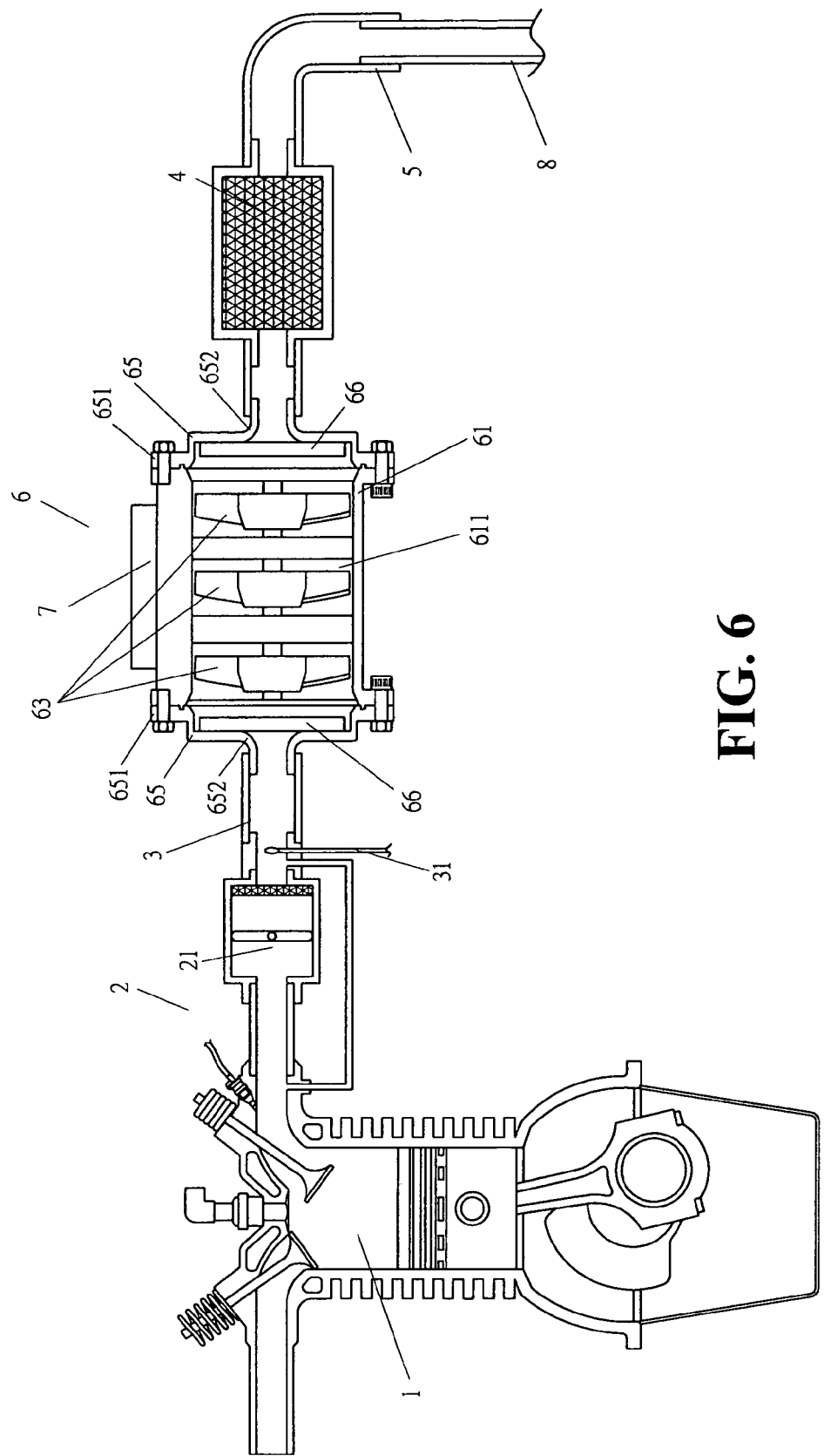
FIG. 6 is another preferred embodiment in accordance with the present invention.

As shown in FIG. 6, there is shown another preferred embodiment in accordance with the present invention. The housing 61 for the fan is mounted between the air filter 4 and the fuel injection mechanism 2 and the connection tube 3 is used as the air storage chamber. When the accelerator is depressed, abundant air and fuel is mixed so that the engine generates the best power.

While the invention has been described with respect to preferred embodiments, it will be clear to those skilled in the art that modifications and improvements may be made to the invention without departing from the spirit and scope of the invention. Therefore, the invention is not to be limited by the specific illustrative embodiment, but only by the scope of the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An apparatus for increasing air fuel ratio of an engine comprising:

an air stream accelerator having a housing, a first connection seat connected with a first end of said housing, said first connection seat having a first base plate, said first base plate having a center provided with a hollow connector in which is fitted a first net hole plate, said first net hole plate allowing pressure of absorbed air to be increased to avoid foreign objects from entering, a controller mounted on a top of said housing, a plurality of fans arranged in said housing and controlled by said controller, an air storage cylinder having a first end engaged with a second end of said housing, a second connection seat connected with a second end of said air storage cylinder, said second connection seat having a second base plate, said second base plate having a center provided with a hollow connector in which is fitted a second net hole plate, said second net hole plate allowing pressure of absorbed air to be increased to avoid foreign objects from entering, a filter disposed within said air storage cylinder; a cover plate engaged with a top of said air storage cylinder; and a connection tube having a first end and a second end, said first end of said connection tube being connected with said hollow connector of said second connection seat; and a fuel injection mechanism having an end connected said connector end of said connection tube.

* * * * *